United States Patent
Manthe et al.

(10) Patent No.: US 11,235,411 B2
(45) Date of Patent: Feb. 1, 2022

(54) WELDING POWER SUPPLY WITH INTERLEAVED INVERTER CIRCUITRY

(71) Applicant: Illinois Tool Works Inc., Glenview, IL (US)

(72) Inventors: Alan Adam Manthe, Hortonville, WI (US); Craig Steven Knoener, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 562 days.

(21) Appl. No.: 15/354,282

(22) Filed: Nov. 17, 2016

(65) Prior Publication Data
US 2017/0189983 A1 Jul. 6, 2017

Related U.S. Application Data

(60) Provisional application No. 62/286,764, filed on Jan. 25, 2016, provisional application No. 62/274,117, filed on Dec. 31, 2015.

(51) Int. Cl.
*B23K 9/10* (2006.01)
*B23K 9/067* (2006.01)
(Continued)

(52) U.S. Cl.
CPC .......... *B23K 9/0671* (2013.01); *B23K 9/1075* (2013.01); *B23K 9/167* (2013.01); *H02M 3/285* (2013.01)

(58) Field of Classification Search
CPC ........ B23K 9/00; B23K 9/067; B23K 9/0671; B23K 9/091; B23K 9/1012; B23K 9/1043; B23K 9/1075
(Continued)

(56) References Cited

U.S. PATENT DOCUMENTS 4,544,826 A * 10/1985 Nakanishi ................ B23K 9/10
219/123
4,628,426 A * 12/1986 Steigerwald ...... H02M 3/33561
336/184

(Continued)

FOREIGN PATENT DOCUMENTS

| CN | 1137962 | 12/1996 |
|---|---|---|
| CN | 1817543 | 8/2006 |
| CN | 101513690 | 8/2009 |

OTHER PUBLICATIONS

Notification of Transmittal of the International Search Report and the Written Opinion of the International Searching Authority, or the Declaration, in international application No. PCT/US2016/065778 dated Apr. 7, 2017 (10 pages).

*Primary Examiner* — Robert J Utama
*Assistant Examiner* — Ayub A Maye
(74) *Attorney, Agent, or Firm* — McAndrews, Held & Malloy, Ltd.

(57) ABSTRACT

Systems and methods for providing welding power supplies with interleaved inverter circuitry are described. In one embodiment, a welding power supply includes, for example, a first inverter circuit and a second inverter circuit that are arranged in parallel. A voltage source or a current source is coupled to a first same node of the first inverter circuit and the second inverter circuit. A filter inductor is coupled to a second same node of the first inverter circuit and the second inverter circuit. The output current of the filter inductor is halved in frequency by disabling one of the first inverter circuit and the second inverter circuit.

12 Claims, 4 Drawing Sheets

(51) Int. Cl.
*H02M 3/28* (2006.01)
*B23K 9/167* (2006.01)

(58) Field of Classification Search
USPC ........ 219/130.1, 130.21, 136, 137.7, 137 PS
See application file for complete search history.

(56) References Cited

U.S. PATENT DOCUMENTS

| | | | |
|---|---|---|---|
| 5,444,356 A * | 8/1995 | Reynolds | B23K 9/1043 323/282 |
| 5,751,150 A * | 5/1998 | Rippel | G01R 31/2841 324/537 |
| 5,930,122 A * | 7/1999 | Moriguchi | H02M 1/10 363/17 |
| 6,154,381 A | 11/2000 | Kajouke | |
| 6,359,258 B1 * | 3/2002 | Blankenship | B23K 9/10 219/130.01 |
| 7,161,332 B1 | 1/2007 | Kleine | |
| 8,179,100 B2 * | 5/2012 | Vogel | H02J 7/0081 320/128 |
| 8,952,293 B2 | 2/2015 | Vogel | |
| 2001/0012207 A1 * | 8/2001 | Nomura | H02M 3/33569 363/17 |
| 2004/0076027 A1 | 4/2004 | Wu | |
| 2006/0213890 A1 * | 9/2006 | Kooken | B23K 9/095 219/130.21 |
| 2009/0230941 A1 | 9/2009 | Vogel | |
| 2011/0309054 A1 * | 12/2011 | Salsich | B23K 9/09 219/108 |
| 2012/0013182 A1 * | 1/2012 | Minegishi | B60L 3/0069 307/9.1 |
| 2013/0242616 A1 * | 9/2013 | Oldenkamp | H02J 3/383 363/16 |
| 2014/0021180 A1 * | 1/2014 | Vogel | B23K 9/1043 219/130.1 |
| 2014/0376268 A1 | 12/2014 | Manthe | |
| 2017/0110991 A1 * | 4/2017 | Frampton | B60L 1/003 |

\* cited by examiner

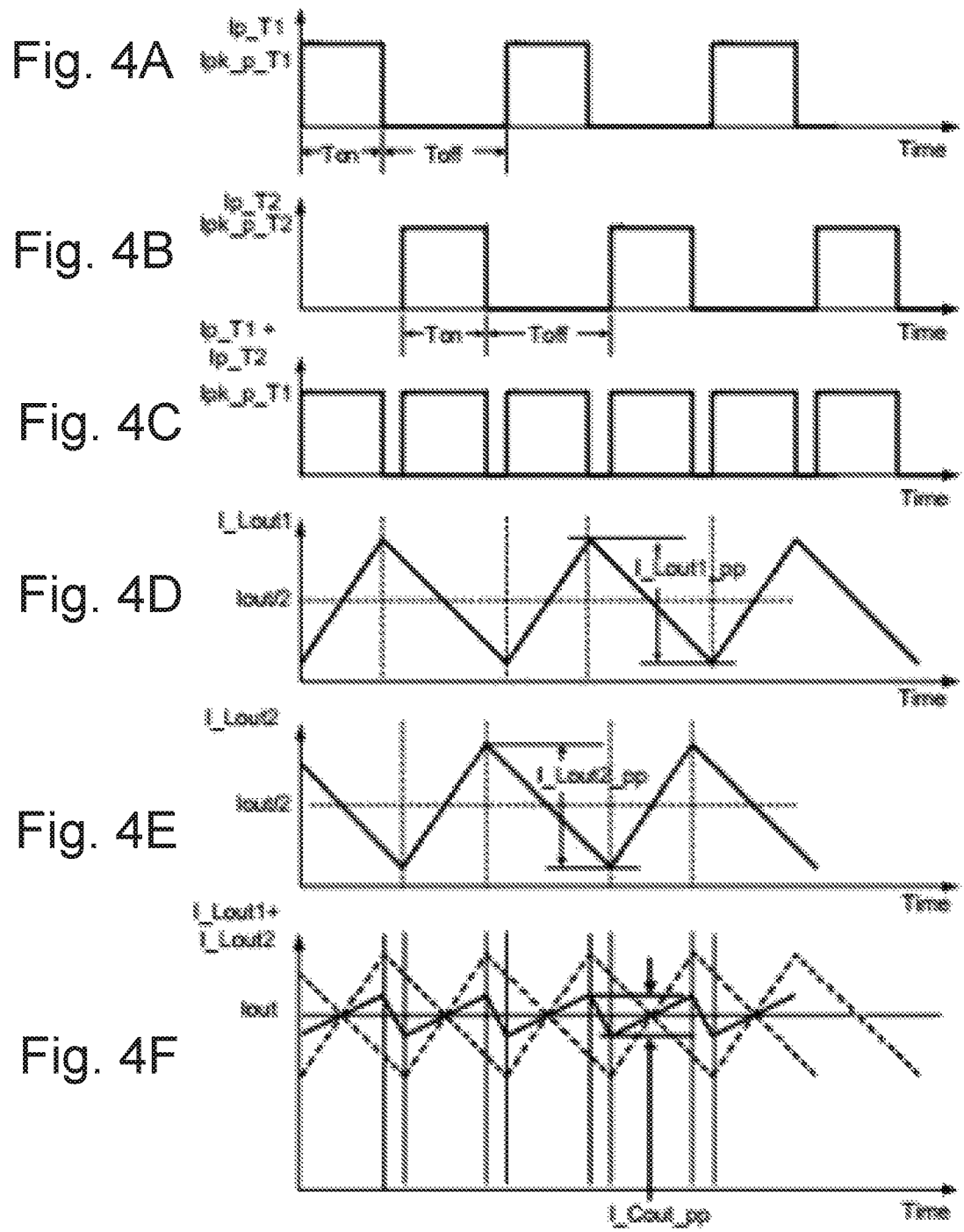

WELDING POWER SUPPLY WITH INTERLEAVED INVERTER CIRCUITRY

CROSS-REFERENCE TO RELATED APPLICATIONS

The present application claims priority to and benefit from U.S. Application No. 62/274,117, filed Dec. 31, 2015, and U.S. Application No. 62/286,764, filed Jan. 25, 2016. The above-identified applications are hereby incorporated herein by reference in their entirety.

BACKGROUND

Power supplies used in welding typically convert alternating current (AC) power from a wall outlet to an output that is suitable for welding operations. The output power is provided at an appropriate voltage and/or current level and can be controlled and regulated according to the process requirements.

During welding operations such as, for example, tungsten inert gas (TIG) lift starts, a short circuit event exists. During the short circuit event, the output current of the power supply is especially difficult to control to an acceptable level so as not to melt the workpiece during the short circuit event.

What is needed is circuitry in the power supply that can reduce the current level and the accompanying heat from the output of the power supply in an efficient and responsive manner.

BRIEF SUMMARY

Methods and systems are provided for a welding power supply with interleaved inverter circuitry substantially as illustrated by and/or described in connection with at least one of the figures, as set forth more completely in the claims.

BRIEF DESCRIPTION OF THE DRAWINGS

FIG. 4A shows an embodiment of primary transformer current from the first inverter circuitry according to the present disclosure.

FIG. 4B shows an embodiment of primary transformer current from the second inverter circuitry according to the present disclosure.

FIG. 4C shows an embodiment of the sum of the current waveforms in FIGS. 4A and 4B according to the present disclosure.

FIG. 4D shows an embodiment of output inductor current based on the output of the first inverter circuitry according to the present disclosure.

FIG. 4E shows an embodiment of output inductor current based on the output of the second inverter circuitry according to the present disclosure.

FIG. 4F shows an embodiment of the sum of the output inductor current waveforms in FIGS. 4D and 4E according to the present disclosure.

DETAILED DESCRIPTION

Some embodiments of the present disclosure relate to systems and methods for providing welding power supplies with interleaved inverter circuitry.

Figure 1:
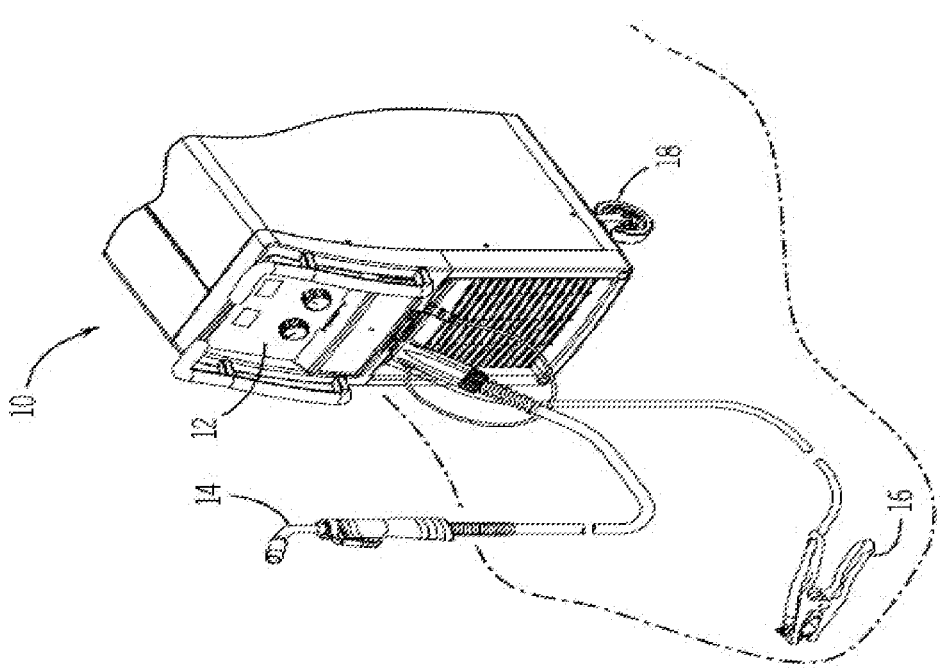
FIG. 1 shows an embodiment of a power supply in a welding system according to the present disclosure.

FIG. 1 shows an exemplary welding power supply 10 which powers, controls, and provides a welding operation in accordance with aspects of the present invention. The side of the power supply 10 that faces the operator includes a control panel 12, through which the operator can control the supply of materials, such as power, gas flow, wire feed, and so forth, to a welding torch 14. A work lead clamp 16 connects to a workpiece to close the circuit between the torch 14, the workpiece, and the power supply 10, and to ensure proper current. In some embodiments, such as for stick welding operations, the torch 14 can be an electrode. The portability of the power supply 10 can be enhanced by a set of wheels 18, which enable the operator to move the power supply 10 to the location of the weld. Internal components of the power supply 10 can be configured to convert power from a wall outlet or other source of AC or direct current (DC) voltage, such as a generator, battery or other source of power, to an output consistent with the voltage, current, and/or power requirements of a welding arc maintained between the workpiece and the welding torch 14.

In some embodiments, the power supply 10 is inverter-based and includes two interleaved inverters for producing the weld output. With this topology the ripple frequency seen on the output is twice that of the fundamental switching frequency of the inverters. To control the current into a short circuit, such as during welding operations such as TIG lift starts, the switching frequency of the power source is reduced. The switching frequency can be reduced by disabling one of the inverters during the short circuit condition. When one inverter is disabled, the output frequency is the same as the fundamental frequency of each of the inverters or half the original frequency (i.e., the frequency when both inverters are enabled in this example). This reduction in output ripple frequency limits the current (and heat) being delivered to the workpiece.

An inverter, as used herein, can be an inverter or a converter. In some embodiments, an inverter can include a power circuit that receives or provides a DC bus signal that is inverted to be an AC signal. In some embodiments, an inverter can be a converter that includes a power circuit that receives or provides an AC or DC signal, and converts it to one or the other of an AC or DC signal, or to a different frequency. Thus, the term inverter can encompass within its scope, for example, a buck converter, a power converter, a boost converter, an inverter, an isolated inverter or converter, a DC-to-AC inverter or converter, a high frequency (e.g., frequencies higher than approximately ten times a line frequency) inverter, etc.

By employing the interleaved inverter arrangement in the power supply 10, some embodiments avoid circuit complexity without a loss in response time. For example, by using the interleaved inverter arrangement, some embodiments can avoid additional circuitry that would continuously slew the frequency through a time dependent control loop. In contrast, by using the interleaved inverter arrangement, some embodiments can change the output frequency (e.g., by double or by half) almost instantly by enabling or disabling one of the inverters, for example, via switches in the inverters. The switches can be controlled (e.g., turned off or on) by sensors that detect, for example, a short circuit condition or a normal operating condition during a welding operation. Further, by using the interleaved inverter arrangement, some embodiments provide that the fundamental frequency, which can also be referred to as the fundamental operating frequency, of any of the interleaved inverter circuits does not change. The fundamental frequency is the operating frequency of the inverter circuit. In some embodiments, the inverter circuit provides the fundamental frequency when operating and provides a different frequency (e.g., approximately 0 Hz) when the inverter circuit is not operating. This is different from a more complicated circuit in which the fundamental frequency of an inverter circuit is changed by a frequency control loop.

In some embodiments, by using the interleaved inverter arrangement, welder current can be controlled into a short circuit condition (e.g., a TIG lift start). The interleaved inverter arrangement can limit the energy that is provided into the short circuit so as not to melt and/or fuse the tungsten (or other material) and the base material together, thereby causing "sticky" starts.

Figure 2:
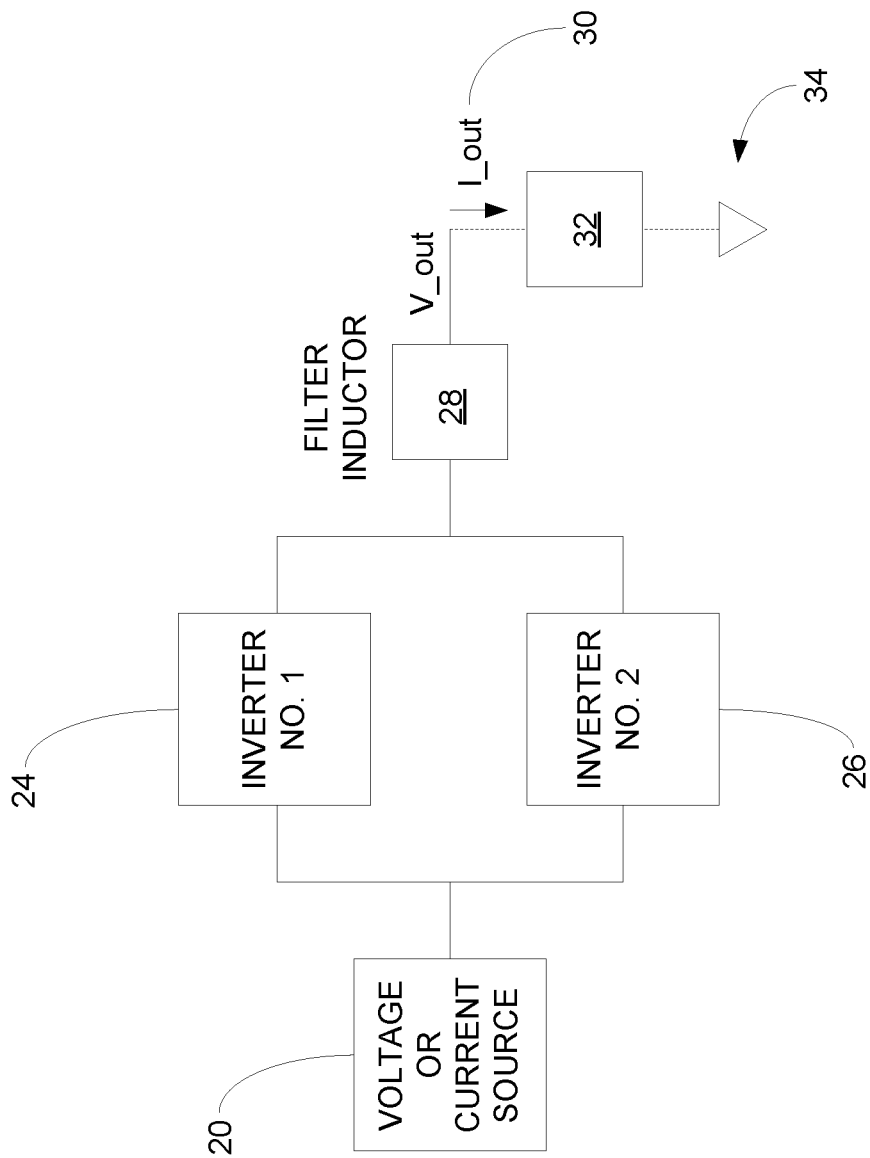
FIG. 2 shows an embodiment of some components of a power supply system according to the present disclosure.

FIG. 2 illustrates an exemplary block diagram of some components that can be included in the welding power supply 10. Specifically, FIG. 2 illustrates a voltage or current source 20 which, in operation, outputs DC to a first inverter circuit 24 and a second inverter circuit 26. In some embodiments, the voltage or current source 20 may be a DC source, such as a battery. In some embodiments, the voltage or current source 20 can include a circuit that rectifies incoming AC and converts it to DC.

The first inverter circuit 24 and the second inverter circuit 26 can be configured in a parallel arrangement or an interleaved arrangement. On one side, the first inverter circuit 24, the second inverter circuit 26, and the voltage or current source 20 are connected to the first same node (e.g., first same circuital node). On the other side, the first inverter circuit 24, the second inverter circuit 26, and the filter inductor 28 are connected to the second same node.

The inverter circuits 24, 26 operate to combine their respective outputs at a single node, which feeds into a filter inductor 28 that supplies an output voltage V_out for the welding operation. By disabling one of the inverter circuits 24, 26, the output current I_out can be reduced in frequency by half. The welding arc 32 is supplied with a welding current 30 and is connected to workpiece 34. In some embodiments, individual inductors may be utilized in place of the filter inductor 28. In other embodiments, the inductor 28 may have multiple windings used to combine the outputs of the two inverter circuits 24, 26.

Figure 3:
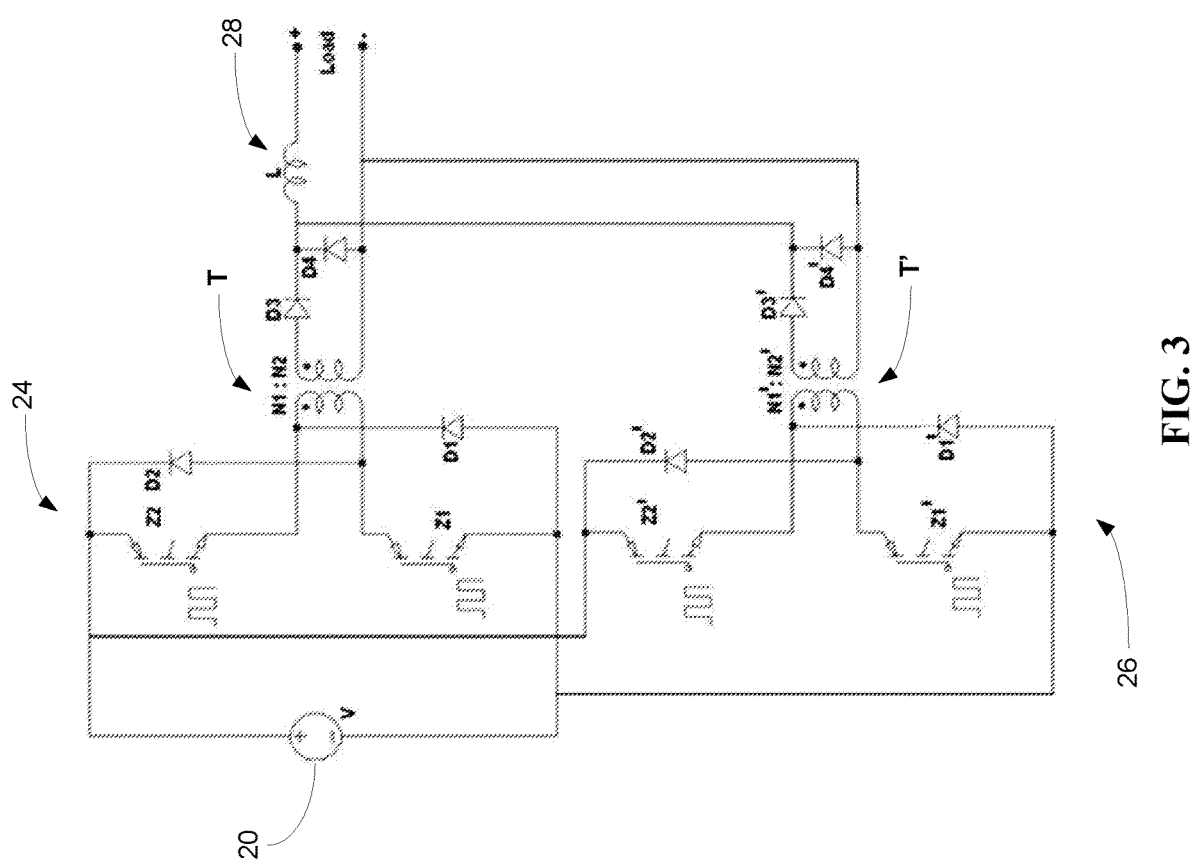
FIG. 3 shows an embodiment of interleaved inverter circuitry according to the present disclosure.

FIG. 3 is a circuit diagram illustrating an embodiment of the interleaved inverter circuitry in the welding power supply 10 that includes, for example, a first inverter circuit 24 (e.g., a first forward inverter circuit) and a second inverter circuit 26 (e.g., a second forward inverter circuit) according to the present disclosure. The voltage or current supply 20 is configured to provide DC power to the first converter circuit 24 and the second converter circuit 26.

In the first inverter circuit 24, a pair of switches Z1, Z2 (e.g., power semiconductor switches) chops the DC voltage and supplies it to a transformer T on the side of a primary winding of the transformer T (left side of transformer T in FIG. 3). The transformer T transforms the chopped primary voltage to a secondary voltage, at a level suitable for a cutting or welding arc, and supplies it to a secondary winding of the transformer T (right side of transformer T in FIG. 3). The secondary voltage is then rectified by rectifier diodes D3, D4 and supplied to the filter inductor 28. A set of diodes D1, D2 provides a free-wheeling path for the magnetizing current stored in the transformer T to flow when the pair of switches Z1, Z2 turns off, and thus resets the magnetic flux or energy stored in the transformer core. Further, when switches Z1, Z2 are turned off, the first inverter circuit 24 is disabled and the first inverter circuit 24 no longer contributes to the output current through the filter inductor 28.

Similarly, in the second inverter circuit 26, a pair of switches 58, 60 (e.g., power semiconductor switches) chops the DC voltage and supplies it to a transformer T' on the side of a primary winding of the transformer T' (left side of transformer T' in FIG. 3). The transformer T' transforms the chopped primary voltage to a secondary voltage and supplies it to a secondary winding of the transformer T' (right side of transformer T' in FIG. 3). The secondary voltage is then rectified by rectifier diodes D3', D4' and supplied to the filter inductor 28. A set of diodes D1', D2' provides a free-wheeling path for the magnetizing current stored in the transformer T' to flow when the pair of switches Z1', Z2' turns off, and thus resets the magnetic flux or energy stored in the transformer core. Further, when switches Z1', Z2' are turned off, the second inverter circuit 26 is disabled and the second inverter circuit 24 no longer contributes to the output current through the filter inductor 28.

The combined rectified secondary voltage is supplied to the welding power supply output V_out and a welding current I_out is output from the circuits 24, 26 through the filter inductor 28. In some embodiments, the inverter circuits 24, 26 can include additional components or circuits, such as capacitors, snubbers, voltage clamps, resonant "lossless" snubbers or clamps, gate drive circuits, pre-charge circuits, pre-regulator circuits, etc. In some embodiments, a single ground can be configured to support both inverter circuits 24, 26, and the output of the diodes D3, D4 of the first inverter circuit 24 would couple with the output of the diodes D3', D4' of the second inverter circuit 26 before entering the inductor 28.

FIGS. 4A-F show embodiments of various intermediate and output currents from the interleaved inverter circuit 24, 26 of the power supply 10. FIGS. 4A and 4B show the corresponding primary transformer current of the first inverter circuit 24 and the second inverter circuit 26, respectively. The inverter circuits 24, 26 are operated out of phase. In FIGS. 4A and 4B, the inverter circuits 24, 26 are operated out of phase by 180°. Thus, in some embodiments, while the primary transformer currents in FIGS. 4A and 4B are at the same frequency (e.g., the fundamental frequency of an individual inverter circuit) and are 180° out of phase, the combined current in FIG. 4C is characterized by twice the frequency. FIGS. 4D and 4E show the corresponding output inductor currents from the first inverter circuit 24 and the second inverter circuit 26, respectively. FIG. 4F shows the sum of the output inductor currents from FIGS. 4D and 4E.

Accordingly, where a reduction in current (and heat) is advantageous for a welding operation (e.g., during a short circuit condition, a TIG lift start, a gas tungsten arc welding (GTAW) lift start, etc.), one of the inverter circuits 24, 26 can be disabled via the switches Z1, Z2, Z1', Z2' and the frequency of the current can be halved. Subsequently, where an increase in current (and heat) is advantageous for a welding operation, both of the inverter circuits 24, 26 can be enabled via the switches Z1, Z2, Z1', Z2' and the frequency can be doubled. In some embodiments, the output current frequency can be changed (e.g., doubled and/or halved) without changing the fundamental frequency of any of the inverter circuits 24, 26.

Some embodiments contemplate that, in addition to disabling one of the interleaved inverter circuits 24, 26, the main control loop in firmware is overridden for approximately 25 ms during the short circuit condition. During this time, the minimum pulse width (e.g., minimum "on" time) is used and the feedback control is ignored. In some embodiments, the minimum "on" time can be approximately 12 µs or less. In some embodiments, the minimum "on" time can be approximately 1 μs or less. One of the purposes for overriding the control is to minimize the output current into a short circuit.

This behavior is generally governed by the formula:

$$Io = \frac{Vo * Tmin}{Rsc * (\text{Period-}Tmin)}$$

where Io is the average short circuit current, Vo is the open circuit voltage of the power source, Tmin is the minimum "on" time, Rsc is the short circuit resistance, and Period is the switching period seen at the load. This combination of increasing the period and having a small minimum "on" time can provide very clean and consistent TIG lift starts.

Although illustrated as two interleaved inverters 24, 26, some embodiments contemplate using more than two interleaved inverter circuits 24, 26. Additional inverter circuits can provide greater frequency range and relatively greater control. For example, with three interleaved inverter circuits, each with a fundamental frequency of f and being 120° out of phase, a welding power supply can provide output currents at frequencies of 3f, 2f, and f, by disabling zero, one, or two of the inverter circuits. In another example, with N interleaved inverter circuits, each with a fundamental frequency of f and being 360°/N out of phase, a welding power supply can provide output currents at frequencies of Nf, (N−1)f, . . . , 2f, and f, by disabling zero, one, . . . , or N−1 of the inverter circuits.

Instead of or in addition to disabling one or more interleaved inverters, some embodiments contemplate reducing the frequency by half (or another factor) by gating the inverters in phase with each other. For example, the frequency can be halved by gating the inverters in phase with each other instead of being interleaved.

Some embodiments also contemplate that the interleaved inverter circuits can be used in power supplies used for plasma cutting.

Some embodiments further contemplate that the interleaved inverter circuits can be in used in other power supplies for other applications.

While the present methods, processes, and systems have been described with reference to certain implementations, it will be understood by those skilled in the art that various changes may be made and equivalents may be substituted without departing from the scope of the present methods, processes, and systems. In addition, many modifications may be made to adapt a particular situation or material to the teachings of the present disclosure without departing from its scope. Therefore, it is intended that the present methods, processes, and systems not be limited to the particular implementations disclosed, but that the present methods, processes, and systems will include all implementations falling within the scope of the appended claims.

What is claimed is:

1. A welding power supply, comprising:
   a first converter arranged in parallel with a second converter, the first converter to provide a first output and the second converter to provide a second output;
   a voltage source or a current source coupled to the first converter and the second converter;
   a filter coupled to the first converter and the second converter, the first output and the second output to be supplied to the filter;
   one or more first switches configured to disable an output current of the first converter for one or more cycles in response to detection of a short circuit condition;
   one or more second switches configured to output current from the second converter for two or more cycles when the first converter is disabled, wherein the filter provides an output current whose frequency is reduced in half by the disabling of the first converter in response to the short circuit condition during a welding operation; and
   a welding tool to receive the output current from the filter.

2. The welding power supply according to claim 1, wherein the output current changes frequency without changing a fundamental operating frequency of the first converter and the fundamental operating frequency of the second converter.

3. The welding power supply according to claim 1, wherein the first converter includes a transformer and one or more rectifying diodes, and wherein the transformer and the one or more rectifying diodes are coupled to the filter.

4. The welding power supply according to claim 1, wherein the first converter and the second converter are substantially identical and configured to provide the first and second outputs 180 degrees out of phase.

5. The welding power supply according to claim 1, wherein the filter includes one or more inductors.

6. The welding power supply according to claim 1, wherein one of the first converter and the second converter is configured to be disabled during a tungsten inert gas (TIG) lift start.

7. The welding power supply according to claim 1, wherein the filter receives one of the first output or the second output in response to disabling one of the first converter and the second converter, such that the filter provides the output current with the frequency reduced in half.

8. The welding power supply according to claim 1, further comprising a sensor to detect the short circuit condition.

9. A welding power supply, comprising:
   N converters arranged in parallel with each other;
   a voltage or current source coupled to the N converters;
   one or more first switches configured to disable an output current of N−1 converters of the N converters for one or more cycles in response to detection of a short circuit condition; one or more second switches configured to output current from another converter for two or more cycles when the N−1 converters are disabled during a welding operation; and a filter inductor coupled to the N converters,
   wherein the filter provides an output current whose frequency is reduced by a factor of 1/N by disabling N−1 of the N converters in response to a command to reduce the output current based on detection of the short circuit, where N is a positive integer of two or more; and a welding tool to receive the output current from the filter.

10. The welding power supply according to claim 9, wherein the N−1 converters are configured to be disabled during a welding operation in which a short circuit condition exists, the command being generated in response to identification of the short circuit condition.

11. The welding power supply according to claim 9, wherein the N−1 converters are configured to be disabled during a tungsten inert gas (TIG) lift start, the command being generated in response to identification of the TIG lift start.

12. The welding power supply according to claim 9, wherein the output current changes frequency without changing a fundamental operating frequency of any of the N converters.

* * * * *